US012264786B2

(12) United States Patent
Kienlein et al.

(10) Patent No.: US 12,264,786 B2
(45) Date of Patent: Apr. 1, 2025

(54) DELIMITING UNIT, PIPELINE SYSTEM AND METHOD FOR OPERATING A PIPELINE SYSTEM

(71) Applicant: DEHN SE, Neumarkt i.d.OPf. (DE)

(72) Inventors: Manfred Kienlein, Neumarkt (DE); Tobias Braun, Mühlhausen (DE); Jens Ehrler, Neumarkt (DE)

(73) Assignee: DEHN SE, Neumarkt i.d.OPf. (DE)

( * ) Notice: Subject to any disclaimer, the term of this patent is extended or adjusted under 35 U.S.C. 154(b) by 139 days.

(21) Appl. No.: 18/017,753

(22) PCT Filed: Aug. 5, 2021

(86) PCT No.: PCT/EP2021/071930
§ 371 (c)(1),
(2) Date: Jan. 24, 2023

(87) PCT Pub. No.: WO2022/037964
PCT Pub. Date: Feb. 24, 2022

(65) Prior Publication Data

US 2024/0052979 A1 Feb. 15, 2024

(30) Foreign Application Priority Data

Aug. 21, 2020 (DE) ........................ 102020121949.0

(51) Int. Cl.
*F17D 3/01* (2006.01)
*C23F 13/04* (2006.01)
*F17D 5/08* (2006.01)

(52) U.S. Cl.
CPC ................ *F17D 3/01* (2013.01); *C23F 13/04* (2013.01); *F17D 5/08* (2013.01)

(58) Field of Classification Search
CPC .... F17D 3/01; F17D 5/08; C23F 13/04; C23F 2213/32

(Continued)

(56) References Cited

U.S. PATENT DOCUMENTS 8,228,078 B2 7/2012 Herraez et al. ............... 324/705
2003/0169058 A1 9/2003 Pierre et al. .................. 324/700
(Continued)

FOREIGN PATENT DOCUMENTS

CN 104651855 A 5/2015
DE 102005025824 A1 12/2006
(Continued)

OTHER PUBLICATIONS

Notification Concerning Transmittal of International Preliminary Report on Patentability (Chapter I of the Patent Cooperation Treaty), in English, dated Mar. 2, 2023, which was issued by the International Bureau of WIPO in Applicant's corresponding international PCT application having Serial No. PCT/EP2021/071930, filed on Aug. 5, 2021.

(Continued)

*Primary Examiner* — Danny Nguyen
(74) *Attorney, Agent, or Firm* — Bodner & Bodner, PLLC; Christian P. Bodner; Gerald T. Bodner

(57) ABSTRACT

A delimitation unit (18) for a pipe section (24), in particular a pipe section (24) of a pipeline (12), comprises at least one protective component (46), a control unit (48) for controlling the protective component (46), and a communication unit (50) for communicating with a remote monitoring station (14). The communication unit (50) is arranged to receive at least one control command from the monitoring station (14). The control unit (48) is arranged to operate the protective components (46) in different operating modes to maintain the voltage of the pipe section (24) below at least one limit value, and to change the operating modes due to the control command received by the communication unit (50).
Furthermore, a pipeline system (10) and a method of operating a pipeline system (10) are shown.

16 Claims, 3 Drawing Sheets

Figure 1:
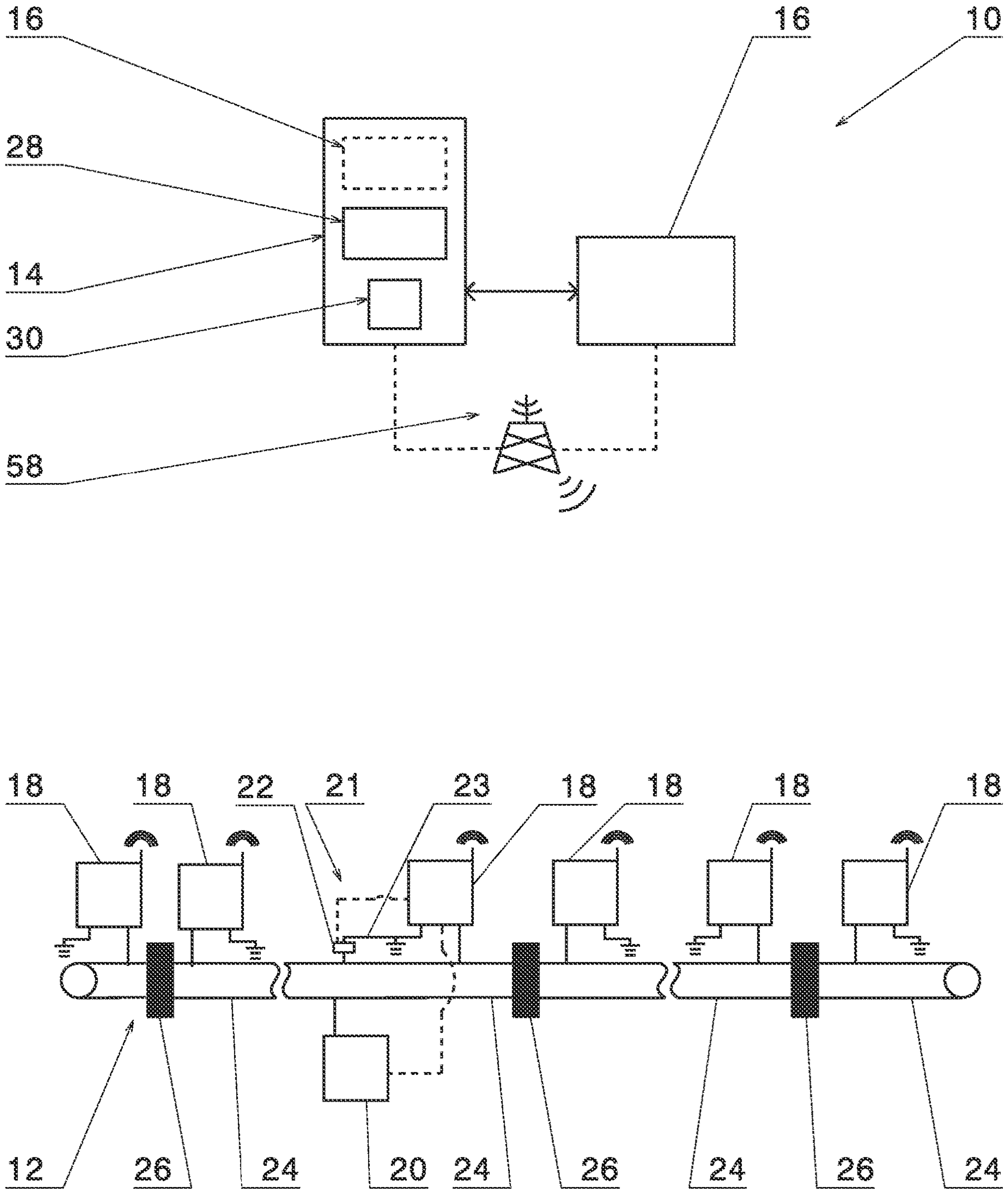

(58) Field of Classification Search
USPC .................................................. 361/117–119
See application file for complete search history.

(56) References Cited

U.S. PATENT DOCUMENTS

| | | | | |
|---|---|---|---|---|
| 2011/0193577 | A1* | 8/2011 | Spruth | G01N 17/02 324/700 |
| 2014/0062720 | A1* | 3/2014 | Spruth | H04Q 9/00 340/870.02 |
| 2014/0151241 | A1 | 6/2014 | Cahill-O'Brien | 205/726 |
| 2018/0216759 | A1 | 8/2018 | Goodson et al. | |
| 2018/0230605 | A1 | 8/2018 | Miller et al. | |

FOREIGN PATENT DOCUMENTS

| | | | | |
|---|---|---|---|---|
| DE | 102005036508 | B4 | 7/2007 | |
| DE | 102012017415 | A1 | 3/2014 | |
| DE | 102017113633 | A1 | 12/2018 | |
| EP | 1728895 | A1 | 12/2006 | |
| FR | 2759512 | A1 | 8/1998 | H04B 13/00 |
| GB | 2518191 | A | 3/2015 | |
| JP | H1137400 | A | 2/1999 | |
| RU | 2660539 | C1 | 7/2018 | |
| WO | WO2007012326 | A2 | 2/2007 | |
| WO | WO2009019717 | A1 | 2/2009 | |

OTHER PUBLICATIONS

English translation of the International Preliminary Report on Patentability (Chapter I of the Patent Cooperation Treaty), dated Feb. 16, 2023, which was issued by the International Bureau of WIPO in Applicant's corresponding international PCT application having Serial No. PCT/EP2021/071930, filed on Aug. 5, 2021.

Written Opinion of the International Searching Authority, in English, dated Nov. 22, 2021, which was issued by the International Bureau of WIPO in Applicant's corresponding international PCT application having Serial No. PCT/EP2021/071930, filed on Aug. 5, 2021.

International Search Report, in English, dated Nov. 22, 2021, which was issued by the International Bureau of WIPO in Applicant's corresponding international PCT application having Serial No. PCT/EP2021/071930, filed on Aug. 5, 2021.

* cited by examiner

DELIMITING UNIT, PIPELINE SYSTEM AND METHOD FOR OPERATING A PIPELINE SYSTEM

The invention relates to a delimitation unit for a pipe section, in particular a pipe section of a pipeline, to a pipeline system having a pipeline, and to a method of operating a pipeline system having a pipe section.

Delimitation units for pipelines are known and are required to divert currents coupled to the pipeline from the surrounding ground via earthing systems specifically inserted for this purpose, and to limit the voltage between the pipeline and electrically conducting structures located in the vicinity for the purpose of personal and property protection.

Previously known delimitation units were operated with predetermined limit values, sampling rates and, where necessary, schedules, the precise values of which were based on estimations and simulations. The limit values, schedules or sampling rates are therefore not optimized for real use, and it is not possible to respond to changes in the surroundings of the pipeline.

This leads to a less efficient operation of the delimitation unit and thus of the entire pipeline system.

It is therefore the object of the invention to provide a delimitation unit, a pipeline system and a method of operating a pipeline system permitting an effective and flexible operation.

The object is achieved by a delimitation unit for a pipe section, in particular a pipe section of a pipeline, comprising at least one protective component, a control unit for controlling the protective component, and a communication unit for communicating with a remote monitoring station. The communication unit is arranged to receive control commands from the monitoring station. The control unit is arranged to operate the protective components in different operating modes to maintain the voltage of the pipe section below at least one limit value, and to change the operating modes due to the control commands received by the communication unit.

As the control unit can receive control commands from a monitoring station by means of the communication unit, a remote adaptation of the operating modes of the delimitation unit is possible. In this way, the actual conditions at the location of the delimitation unit can be taken into consideration and changes in the surroundings can also be taken into account.

A delimitation unit is for example an overvoltage protection device which limits transient overvoltages, temporary overvoltages and/or stationary overvoltages to voltages below respective limit values. More particularly, a delimitation unit does not feed any current into the pipe section. This constitutes a difference to cathodic corrosion protection systems which are also used for individual pipe sections of a pipeline.

The communication unit may also be part of the control unit.

For example, the voltage of the pipe section is the voltage with respect to unloaded earth, i.e. with respect to the delimitation unit thus the voltage between the earthing connection and the pipeline connection.

According to the invention, it is thus basically a delimitation unit for discharging overvoltages. In other words, the delimitation unit according to the invention is arranged to discharge overvoltages.

In one configuration, one of the at least one protective components is a power electronics and/or one of the at least one protective components is a spark gap and/or a varistor, as a result of which different overvoltages can be reliably limited.

For example, the power electronics is arranged for limiting temporary and/or stationary overvoltages and/or the spark gap and/or a varistor for limiting transient overvoltages.

In one configuration, the control unit is arranged to determine measured values, in particular the voltage of the pipe section with respect to earth, in particular an earthing system, the voltage of the pipe section with respect to a reference electrode and/or the current intensity of a discharge current, and to drive the at least one protective component as a function of the measured value. The delimitation unit can therefore respond quickly and in a differentiated manner to different situations.

The earthing system is for example a means introduced into the earth which in most cases is composed of conductive metal having the function to actively participate in the conduction of current. Usually, the delimitation unit conducts the current flow from the pipeline, via the earthing system into the surrounding earth.

For example, a reference electrode is a means serving to determine a precise definition of the local earth potential. No discharge current is conducted via a reference electrode. A reference electrode may be a specific metal part, but may also be a liquid electrode, e.g. made of a copper/copper sulfate solution In one configuration, the control unit is arranged to determine the measured values at a sampling rate, the sampling rate being defined by the operating mode. It is in this way possible to adjust the energy required by the delimitation unit.

For example, the control unit determines the measured value or values over a predetermined time period and transmits the measured value(s) to the monitoring station at the end of the time period. Thus, a cyclic transmission of the measurement data takes place.

The time period may be a minute, an hour, a day, a week and/or a month.

To ensure a reliable transmission, the control unit is arranged to transmit the measured values by means of the communication unit, in particular to the monitoring station and/or to a calculation device.

In one configuration, at least one of the operating modes comprises a schedule in which different limit values and/or sampling rates are assigned to different times, and/or the at least one control command comprises at least part of a schedule, as a result of which it is possible to purposefully meet recurrent but time-limited loads of the pipe section.

To respond differently to various overvoltage types, the at least one limit value can comprise at least one value for transient overvoltages, at least one value for temporary overvoltages and/or at least one value for stationary overvoltages.

The limit value may also comprise a plurality of values for transient, temporary or stationary overvoltages, for example three values for temporary overvoltages of different duration.

To adapt the limit value, the at least one limit value is defined by the operating mode and/or the at least one control command comprises at least part of the at least one limit value.

In one configuration, the control unit is arranged to operate the protective components in at least three conditions, more particularly an active condition in which the full functionality of the delimitation unit is available, a standby condition in which the protective components are only operated to prevent temporary and transient overvoltages, and a passive condition in which the protective components are deactivated. In this way, the delimitation unit may allow maintenance works or measurements at the pipe section.

For example, the delimitation unit can take measurements in the passive condition, i.e. the delimitation unit is not switched off in the passive condition.

The communication unit may be a communication unit for mobile radio, for example 4G or 5G mobile radio, for a low power wide area network, in particular Narrowband lot, and/or for a telecontrol system, which ensures a secure communication.

The object is further achieved by a pipeline system having a pipeline comprising at least one pipe section, at least one delimitation unit as described above which is electrically connected to the pipe section of the pipeline, and a monitoring station remote from the delimitation unit and arranged to transmit control commands to the at least one delimitation unit.

The features and advantages mentioned as to the delimitation unit equally apply to the pipeline system and vice versa.

The monitoring station is more particularly arranged to receive measured values from the at least one delimitation unit.

Of course, the pipeline may have at least one further pipe section, and the pipeline monitoring system may have at least one further delimitation unit, the delimitation units each being assigned to one of the pipe sections and being electrically connected thereto. It is also conceivable that two or more delimitation units are assigned to each pipe section.

In one configuration, the pipeline system has an additional safety means, in particular a contactor, a calculation device, in particular a server, and/or the pipeline system has at least one cathodic corrosion protection system which is electrically connected to the pipe section of the pipeline, in particular also electrically connected to the delimitation unit. In this way, the safety or the lifetime of the pipeline system may be further increased and/or required computing power may be provided in a decentralized manner.

The additional safety means may be separate from the delimitation unit.

For example, the safety means has an electrical bypass which runs parallel to the delimitation unit and connects the pipe section and the earthing system. The contactor which may interrupt or switch the bypass to be conducting may be provided in the bypass.

The server may be a cloud server.

Furthermore, the object is achieved by a method of operating a pipeline system, in particular as described above, including a pipe section and a delimitation unit, the method comprising the following steps:

a) transmitting at least one control command from a remote monitoring station to the delimitation unit, and
b) operating at least one protective component of the delimitation unit by means of a control unit of the delimitation unit in an operating mode determined on the basis of the control command.

The features and advantages mentioned for the delimitation unit and/or the pipeline system apply equally to the method and vice versa.

In particular, the components of the delimitation unit and/or the pipeline system are configured and arranged to perform the respective steps of the method.

To be able to control the delimitation unit depending on the situation on site, the method may comprise the following steps:

a) determining at least one measured value by means of the delimitation unit, in particular a measured value of the voltage of the pipe section with respect to earth and/or the voltage of the pipe section with respect to a reference electrode and/or the current intensity of a discharge current,
b) transmitting the measured value to the monitoring station and/or the calculation device by means of the delimitation unit,
c) evaluating the measured value and determining a control command for the at least one delimitation unit on the basis of the measured value by means of the monitoring station and/or the calculation device, and
d) transmitting the control command from the monitoring station and/or the calculation device to the at least one delimitation unit.

In one configuration, the monitoring station determines a loading condition of the pipe section and/or the maintenance condition of the at least one delimitation unit, in particular the condition of an earthing system of the delimitation unit on the basis of the transmitted measured value. In this way, necessary maintenance works can be carried out in due time.

To operate the pipeline system in a more energy-saving manner, the monitoring station and/or the calculation device can estimate at least one expected future value on the basis of the at least one measured value and determine an adapted limit value, an adapted schedule, an adapted sampling rate or an adapted condition on the basis of the future value, in particular wherein the control command which takes the adapted limit value, the adapted schedule or the adapted condition into account is generated and transmitted to the delimitation unit by the monitoring station.

For example, the delimitation unit determines at least one measured value, in particular a measured value of the voltage of the pipe section with respect to earth, the voltage of the pipe section with respect to a reference electrode and/or the current intensity of a discharge current, and the monitoring station and/or the delimitation unit activate(s) the additional safety means, in particular if the measured value exceeds a safety threshold value, as a result of which the safety is further increased.

Upon activation of the safety means, the contactor is for example switched, such that the bypass is conducting and grounds the pipe section directly via the earthing system.

Figure 2:
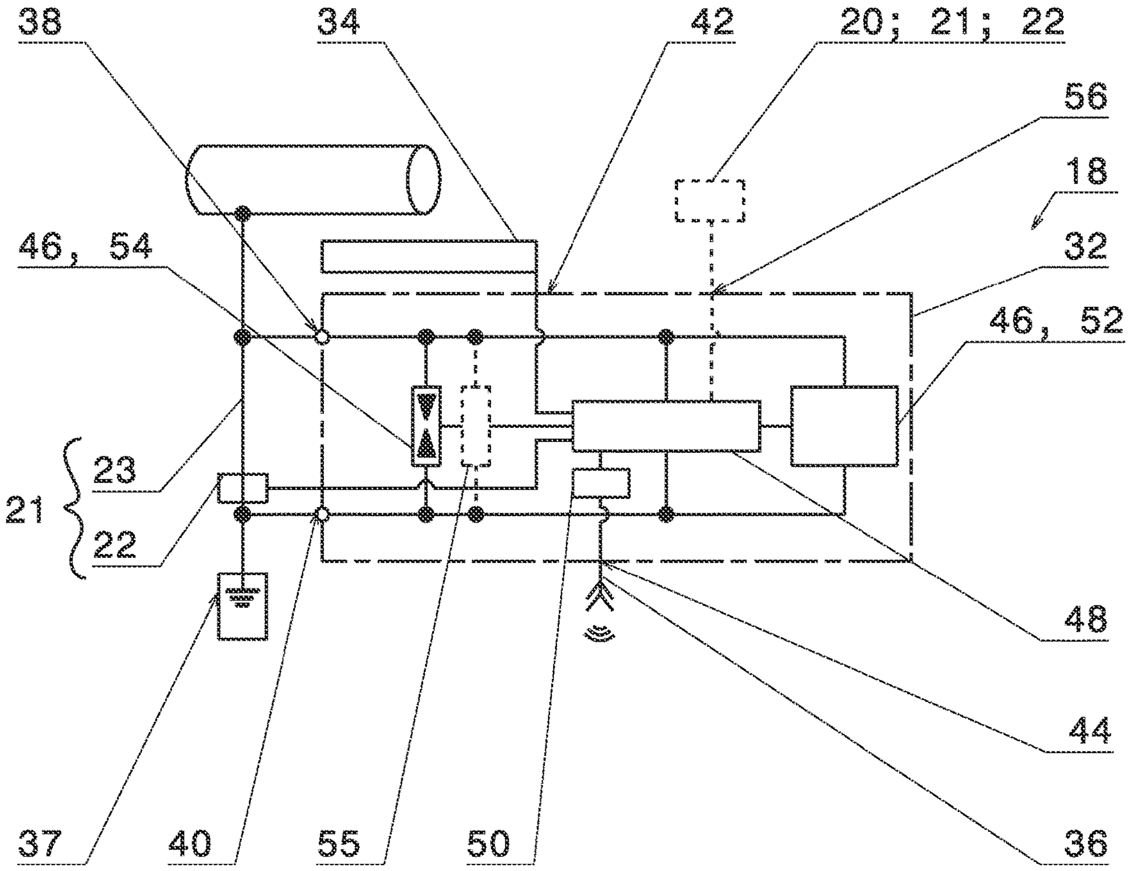
Figure 3:
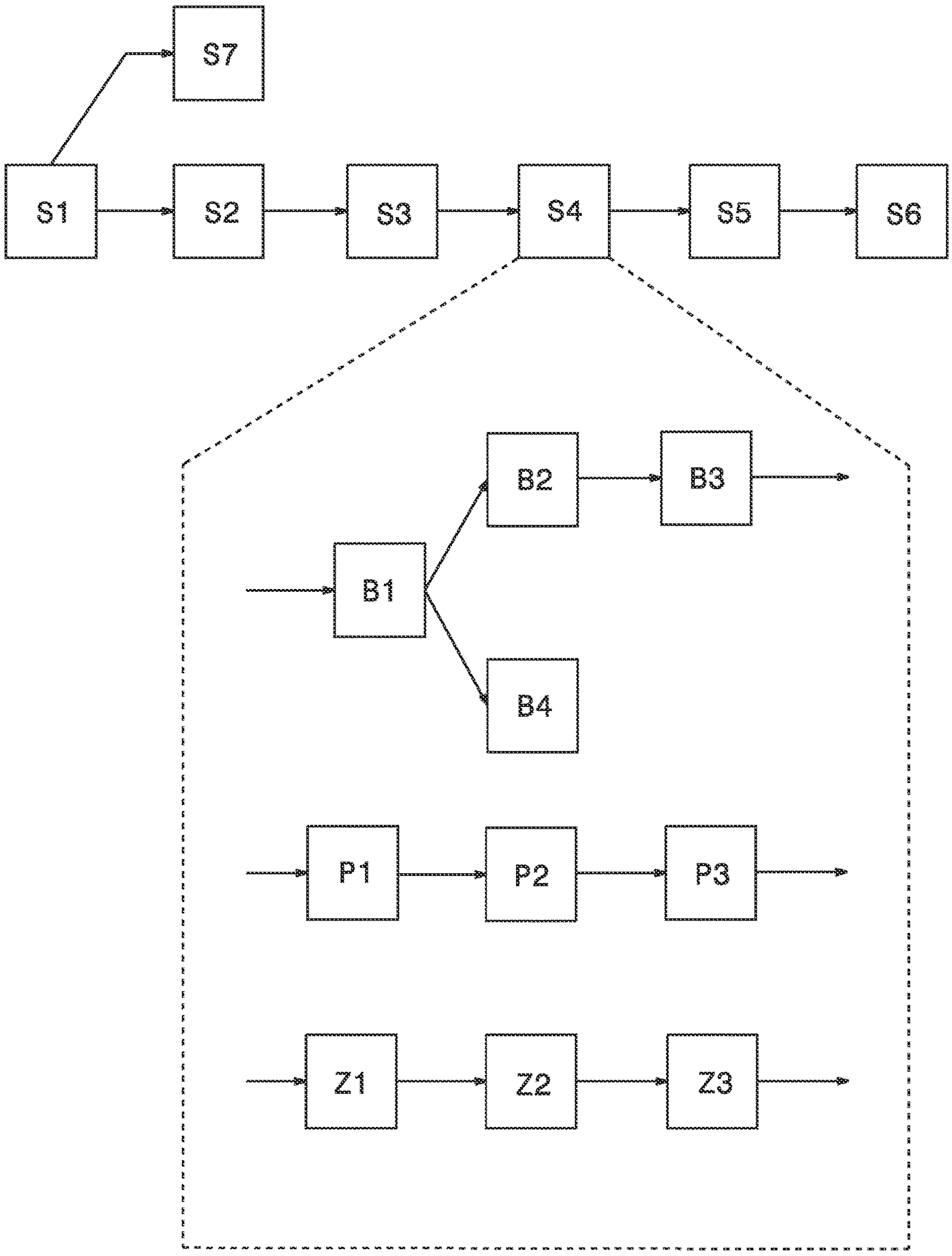

Further features and advantages of the invention will become apparent from the description below and from the accompanying drawings, to which reference is made and in which:

FIG. 1 shows a pipeline system according to the invention comprising a plurality of delimitation units according to the invention, FIG. 2 shows a detailed view of a delimitation unit according to FIG. 1, and FIG. 3 shows a flow chart of a method according to the invention.

A pipeline system 10 is schematically shown in FIG. 1.

The pipeline system includes a pipeline 12, a monitoring station 14, a calculation device 16, a plurality of delimitation units 18, a plurality of cathodic corrosion protection systems 20 (CCP) and at least one additional safety means 21 having a contactor 22.

The pipeline 12 has a plurality of pipe sections 24, which are all interconnected by an insulating piece 26.

The monitoring station 14 is provided remotely from the pipeline 12 and has at least one control computer 28 and a communication module 30.

The monitoring station 14 is, for example, a pipeline control measuring station, such as a measuring station of the operator of the pipeline 12.

The calculation device 16 is a computer, for example a server, which can also be configured in a decentralized manner, i.e. in a cloud.

In the case shown, the calculation device 16 is configured separately from the monitoring station 14. However, it can also be part of the monitoring station 14, for example of the control computer 28, as shown in dashed lines in FIG. 1.

Two delimitation units 18 each are assigned to one of the pipe sections 24 and are electrically connected thereto. The CCP 20 and the additional safety means 21 are also assigned to one of the pipe sections 24 of the pipeline 12.

The CCP 20 are connected to the respective pipe section 24 in a manner known per se for corrosion protection.

The safety means 21 are electrically connected to the respective CCP 20 or the respective delimitation unit 18 of the associated pipe section 24.

The additional safety means 21 has, for example, an electrical bypass 23 which runs parallel to the delimitation unit 18 and which connects the pipe section 24 and the earthing system 37. The contactor 22 which can interrupt or switch the bypass 23 to be conducting is provided in the bypass 23. In other words, the pipe section 24 can be directly electrically connected to the earthing system 37 via the bypass 23—with the contactor 22 in the appropriate position.

The CCP 20 can also be electrically connected to the delimitation unit 18 of the respective pipe section 24.

FIG. 2 schematically shows a delimitation unit 18 in an exemplary manner.

The delimitation unit 18 has a housing 32 and an earthing system 37. Furthermore, the delimitation unit 18 can have a reference electrode 34 and/or an antenna 36.

For example, the housing 32 comprises a pipeline connection 38 and a ground connection 40 and may comprise a reference electrode connection 42 and/or an antenna connection 44.

Within the housing 32, the delimitation unit 18 has a plurality of protective components 46, a control unit 48, and a communication unit 50.

In the example embodiment shown, the protective components 46 are a power electronics 52 and a spark gap 54 and/or a varistor 55.

The power electronics 52 is configured to limit temporary and/or stationary overvoltages, and the spark gap 54 and/or the varistor 55 are/is configured to limit transient overvoltages.

For this purpose, the protective components 46, i.e. the power electronics 52 and the spark gap 54 or the varistor 55 are electrically connected to the control unit 48 for control.

To discharge overvoltages, the delimitation unit 18 is electrically connected to the pipeline by means of the pipeline connection 38 and earthed by means of the earthing connection 40. In the example embodiment shown, the protective components 46 and the control unit 48 are connected in parallel and are thus each provided between the pipeline connection 38 and the earthing connection 40.

The delimitation unit 18 is earthed via the earthing system 37, which is connected to the earthing connection 40.

The earthing system 37 is for example a rod made of conductive metal inserted into the ground and intended to actively participate in the current conduction.

On the other hand, the reference electrode 34 is provided to determine the local earth potential. Thus, no discharge current is conducted via the latter. The reference electrode 34 can be a metal part, but can also be a liquid electrode made of a copper/copper sulfate solution.

If a reference electrode 34 is present, it is connected to the control unit 48 via the reference electrode connection 42.

The communication unit 50 is electrically connected to the control unit 48 and may in particular be part of the control unit 48.

The communication unit 50 may be electrically connected to the antenna 36, for example via the antenna connection 44. However, it is also conceivable that the antenna 36 is implemented within the housing 32, for example on a printed circuit board, such as the printed circuit board of the control unit 48.

The communication unit 50 is a communication unit for mobile radio, for example 4G or 5G mobile radio, for a low power wide area network (also called LPWAN or LPN), in particular Narrowband IoT, and/or for a telecontrol system.

Accordingly, the communication module 30 of the monitoring station 14 is also a communication unit for mobile radio, for a low power wide area network and/or for a telecontrol system.

The control unit 48 may be electrically connected to the CCP 20 and/or the corresponding contactor 22 of the associated pipe section 24 via suitable further connections 56 for control purposes.

The delimitation unit 18, more specifically the control unit 48, is arranged to determine measured values, for example the voltage of the pipe section 24 with respect to earth, i.e. the earthing system 37, the voltage of the pipe section 24 with respect to the reference electrode 34 and/or the current intensity of a discharge current from the pipe section 24 to the earthing system 37.

The measured values may be determined at a sampling rate by the control unit 48 and stored in the control unit 48.

For example, the measurement data does not include the current introduced into the pipe section 24 by the CCP 20.

The control unit 48 is arranged to operate and therefore control the protective components 46, i.e. the power electronics 52 and the spark gap 54 or the varistor 55.

To limit transient overvoltages, temporary overvoltages and stationary overvoltages between the associated pipe section 24 and the unloaded earth, at least one limit value is stored in the control unit 48, which comprises a value for transient overvoltages, a value for temporary overvoltages and a value for stationary overvoltages.

Of course, further values can be defined within a type of overvoltage depending on the duration of a current surge. For example, temporary overvoltages are divided into ranges with three different durations, with a different value being stored as a limit value for each of these ranges.

Furthermore, the control unit 48 is arranged to deactivate individual, several or all protective components 46.

For example, the control unit can activate all protective components 46 (active condition) so that the full functionality of the delimitation unit 18 is available.

The control unit 48 can also operate the protective components 46 only to prevent temporary and transient overvoltages, for example, to drive the power electronics 52 and the spark gap 54 or the varistor 55 such that only the limit values for temporary and transient overvoltages are monitored (standby condition).

In addition, the control unit 48 can run a passive condition in which the protective components 46 are switched off.

In the passive condition, however, measurements by the control unit 48 are still possible. This means that the delimitation unit 18 is not completely switched off.

The control unit 48 may also include one or more schedules which comprise specific times within a week, month, year or other time division, different limit values, sampling rates or conditions for measurements.

Thus, the control unit 48 may operate the protective components 46 at different thresholds and/or sampling rates, using different schedules, and in different conditions, thus allowing for different operating modes. For example, an operating mode comprises a limit value, a schedule, a sampling rate and/or a condition.

To operate the pipeline system 10, the individual components, in particular the monitoring station 14, the delimitation unit 18, in particular the communication unit 50 and the control unit 48, carry out the method shown in FIG. 3.

The individual components, in particular the monitoring station 14, the delimitation unit 18, the control unit 48 and the communication unit 50, are of course arranged to carry out the steps of the method.

In step S1, the delimitation unit 18, more precisely the control unit 48, determines a measured value.

Subsequently, the control unit 48 transmits the measured value by means of the communication unit 50 and the antenna 36.

The transmission can take place directly after the measurement. However, it is also conceivable that measurements are taken at intervals of the sampling rate over a predetermined period of time and the measurements are transmitted collectively. This cyclical transmission of measurement data saves energy.

For this purpose, the measured values are transmitted by means of the communication unit via a mobile radio network, a low power wide area network or a telecontrol system. For reasons of clarity, only the case of wireless transmission via mobile radio or a low power wide area network (each symbolized by the transmission mast 58) is shown symbolically in FIG. 1.

The measured values are received by the monitoring station and/or the calculation device 16 (step S3), and a control command is generated on the basis of the measured values (step S4).

The control command includes, for example, an instruction to the control unit 48 to change the operating mode, i.e. a limit value or values of the limit value, a modified sampling rate, a modified schedule and/or a modified condition for operating the protective components 46.

The control command is then transmitted to the delimitation unit 18 in step S5. For this purpose, the communication unit 50 and the communication module 30 are again used, which transmit the control commands accordingly.

In step S6, the control unit 48 evaluates the control command and, if necessary, changes the operating mode of the protective components 46 based on the contents of the received control command. In other words, the control unit 48 now operates the protective components 46 in an operating mode determined on the basis of the control command.

Of course, the control unit 48 also drive the protective components 46 independently based on the measured value, i.e. without and before a control command has been transmitted, for example if a limit value for an overvoltage is exceeded (step S7).

It is also possible for the monitoring station 14 and/or the delimitation unit 18 to activate the additional safety means 21, such as the contactor 22, if the measured value exceeds a safety threshold value. The safety threshold value can be different from the limit value.

For example, the delimitation unit 18 switches the contactor 22 independently, e.g. in the event of a defect in the delimitation unit 18.

The monitoring station 14 may also send a command to the delimitation unit 18 to activate or switch the contactor 22, as a result of which the delimitation unit 18 switches the contactor 22 accordingly.

The control command may be determined in step S4 in various ways by the monitoring station 14 and/or the calculation device 16.

For example, in step B1, the monitoring station 14 determines a maintenance condition of the delimitation unit 18, in particular a condition of the earthing system 37. Subsequently, the monitoring station 14 determines an operating mode of the delimitation unit 18 which is optimally adapted to the maintenance condition (step B2) and then determines a control command causing the control unit 48 to change the operating mode to the previously determined optimal operating mode (step B3).

Furthermore, the monitoring station 14 may initiate maintenance of the corresponding delimitation unit 18 if the load condition determined in step B1 requires maintenance (step B4).

The monitoring station 14 can also determine the load condition of the pipe section 24 associated with the corresponding delimitation unit 18 based on the measured values (step P1) and determine modified limit values based on the load condition (i.e. the occurring voltages or currents) (step P2).

For this purpose, the monitoring station 14 may make use of the calculation device 16. Alternatively, the calculation device 16 may receive the measured values directly from the delimitation unit 18 and transmit modified limit values to the monitoring station 14 according to stored algorithms.

In step P3, the monitoring station 14 determines a control command based on the modified limit values.

In addition, control commands can be transmitted to the CCP 20 on the basis of the measured values by means of the monitoring station 14 or the delimitation unit 18 itself, to achieve improved control of the CCP 20.

In a further possibility for generating the control command according to step S4, the calculation device 16 may receive the measured values. Alternatively, the monitoring station 14 may transmit the measured values to the calculation device 16.

The calculation device 16 then determines in step Z1, on the basis of the current measured values of the same and/or another delimitation unit 18 and optionally measured values of the past, expected future values of the corresponding measured value, for example a future expected voltage of the pipe section 24 with respect to the reference electrode 34 or the earth and/or a current intensity of the discharge current.

The past measured values can be immediately past measured values, but also measured values which were measured at the same point in time in a schedule, for example on a certain day of the week at a certain time.

Based on the expected future value, the calculation device 16 determines an adjusted limit value, an adjusted schedule, an adjusted sampling rate or an adjusted condition in step Z2 and transmits this to the monitoring station 14.

The monitoring station 14 then determines a corresponding control command in step Z3.

In other words, the calculation device 16 performs a simulation based on the obtained measurements. In this way, it is possible that the operating mode of the delimitation unit 18 is adapted to the actual conditions on site and is not only based on estimated values.

It is of course also conceivable that the simulation itself is improved on the basis of the measured values obtained, for example in the case that the simulation is based on an artificial neural network.

It is of course also possible that the monitoring station 14 creates a control command which is not based on received measured values. For example, if maintenance is to be performed on certain pipe sections 24, the monitoring station 14 may send a control command to the corresponding delimitation unit 18 to adjust the operating mode accordingly.

For example, based on past values and expected future values, it may be determined that the load on the pipe section 24 is decreasing at a particular time during the week. This may be the case, for example, if the pipe section 24 is located near a commercial area where there is no work at the weekend. In this case, the monitoring station 14 or the calculation device 16 can create a schedule which, for example, reduces the sampling rate for days on weekends, thereby saving energy.

In this way, it is possible to both operate the pipeline system 10 efficiently and to be able to perform predictive maintenance on individual delimitation units 18. In addition, the measured values can be used to document the safety of the system in a particularly simple manner, for example compliance with personal protection.

Furthermore, the transmitted measured values enable a comparison between simulation results and real system data, which can also be used to improve or calibrate simulations.

The invention claimed is:

1. A delimitation unit for a pipe section (24), comprising at least one protective component (46), a control unit (48) for controlling the protective component (46), and a communication unit (50) for communicating with a remote monitoring station (14), wherein the communication unit (50) is arranged to receive at least one control command from the monitoring station (14), wherein the control unit (48) is arranged to operate the protective components (46) in different operating modes to maintain the voltage of the pipe section (24) below at least one limit value, and to change the operating modes due to the control command received by the communication unit (50), and wherein the control unit (48) is arranged to determine measured values at a sampling rate being defined by the operating mode and to drive the at least one protective component (46) as a function of the measured value, and/or wherein at least one of the operating modes comprises a schedule in which different limit values and/or sampling rates are assigned to different times, and/or the at least one control command comprises at least part of a schedule, and/or wherein the control unit (48) is arranged to operate the protective components (46) in at least three conditions.

2. The delimitation unit according to claim 1, characterized in that one of the at least one protective component (46) is a power electronics (52) and/or in that one of the at least one protective components (46) is a spark gap (54) and/or a varistor (55).

3. The delimitation unit according to claim 1, characterized in that the measured values relate to the voltage of the pipe section (24) with respect to earth and/or the voltage of the pipe section (24) with respect to a reference electrode (34) and/or the current intensity of a discharge current.

4. The delimitation unit according to claim 1, characterized in that the control unit (48) is arranged to transmit the measured values by means of the communication unit (50) to the monitoring station (14) and/or a calculation device (16).

5. The delimitation unit according to claim 1, characterized in that the at least one limit value comprises at least one value for transient overvoltages, at least one value for temporary overvoltages and/or at least one value for stationary overvoltages.

6. The delimitation unit according to claim 1, characterized in that the at least one limit value is defined by the operating mode and/or in that the at least one control command comprises at least part of the at least one limit value.

7. The delimitation unit according to claim 1, characterized in that the at least three conditions, relate to an active condition in which the full functionality of the delimitation unit (18) is available, a standby condition in which the protective components (46) are only operated to prevent temporary and transient overvoltages, and a passive condition in which the protective components (46) are deactivated.

8. The delimitation unit according to claim 1, characterized in that the communication unit (50) is a communication unit for mobile radio, for a low power wide area network, and/or for a telecontrol system.

9. A pipeline system having a pipeline (12) comprising at least one pipe section (24), at least one delimitation unit (18) according to claim 1 which is electrically connected to the pipe section (24) of the pipeline (12), and a monitoring station (14) remote from the delimitation unit (18) and arranged to transmit control commands to the at least one delimitation unit (18).

10. The pipeline system according to claim 9, characterized in that the pipeline system (10) includes an additional safety means (21), a calculation device (16), and/or in that the pipeline system (10) includes at least one cathodic corrosion protection system (20) which is electrically connected to the pipe section (24) of the pipeline (12).

11. A method of operating a pipeline system (10), including a pipe section (24) and a delimitation unit (18), comprising the following steps:

a) determining at least one measured value by means of the delimitation unit (18), b) transmitting the measured value to a remote monitoring station (14) and/or a calculation device (16) by means of the delimitation unit (18), c) evaluating the measured value and determining at least one control command for the at least one delimitation unit (18) on the basis of the measured value by means of the monitoring station (14) and/or the calculation device (16), d) transmitting the at least one control command from the remote monitoring station (14) and/or the calculation device (16) to the delimitation unit (18), and e) operating at least one protective component (46) of the delimitation unit (18) by means of a control unit (48) of the delimitation unit (18) in an operating mode determined on the basis of the control command.

12. The method according to claim 11, characterized in that the at least one measured value is a measured value of the voltage of the pipe section (24) with respect to earth and/or the voltage of the pipe section (24) with respect to a reference electrode (34) and/or the current intensity of a discharge current.

13. The method according to claim 11, characterized in that the monitoring station (14) determines a loading condition of the pipe section (24) and/or the maintenance condition of the at least one delimitation unit (18).

14. The method according to claim 11, characterized in that the monitoring station (14) and/or the calculation device (16) estimate(s) at least one expected future value on the basis of the at least one measured value and determine(s) an adapted limit value, an adapted schedule, an adapted sampling rate or an adapted condition on the basis of the future value.

15. The method according to claim 11, characterized in that the delimitation unit (18) determines at least one measured value, and in that the monitoring station (14) and/or the delimitation unit (18) activate(s) the additional safety means (21).

16. A delimitation unit for a pipe section (24) of a pipeline (12), comprising at least one protective component (46), a control unit (48) for controlling the protective component (46), and a communication unit (50) for communicating with a remote monitoring station (14), wherein the communication unit (50) is arranged to receive at least one control command from the monitoring station (14), wherein the control unit (48) is arranged to operate the protective components (46) in different operating modes to maintain the voltage of the pipe section (24) below at least one limit value, and to change the operating modes due to the control command received by the communication unit (50), wherein the delimitation unit is an overvoltage protection device that is configured to discharge overvoltages, thereby limiting the voltage between the pipeline (12) and electrically conducting structures located in the vicinity.

* * * * *